J. O. JOHNSON.
FEED-BOXES FOR HORSES.

No. 185,238. Patented Dec. 12, 1876.

UNITED STATES PATENT OFFICE.

JOSEPH OSCAR JOHNSON, OF SALINAS CITY, CALIFORNIA.

IMPROVEMENT IN FEED-BOXES FOR HORSES.

Specification forming part of Letters Patent No. 185,238, dated December 12, 1876; application filed October 14, 1876.

*To all whom it may concern:*

Be it known that I, JOSEPH OSCAR JOHNSON, of Salinas City, county of Monterey and State of California, have invented an Improved Feed-Box for Horses; and I do hereby declare the following to be a full, clear, and exact description thereof, reference being had to the accompanying drawings.

My invention relates to a novel feed-box for horses and other animals, its object being to prevent the animal from wasting its feed by throwing it out of the box.

Figure 1:
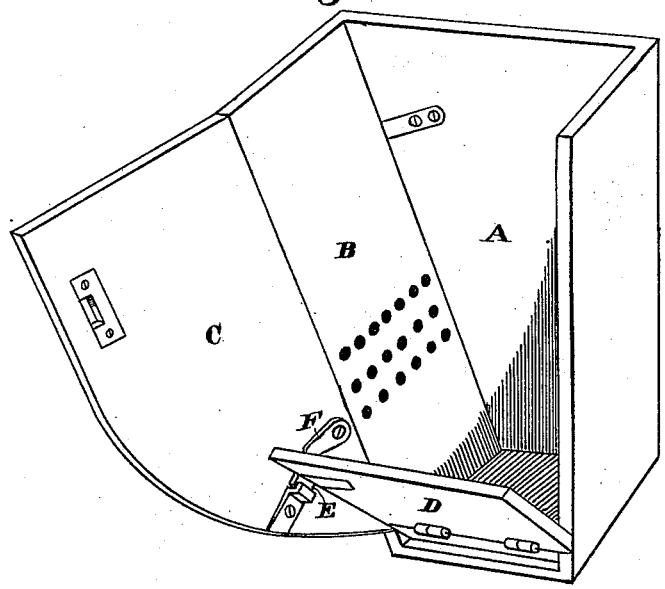
Figure 2:
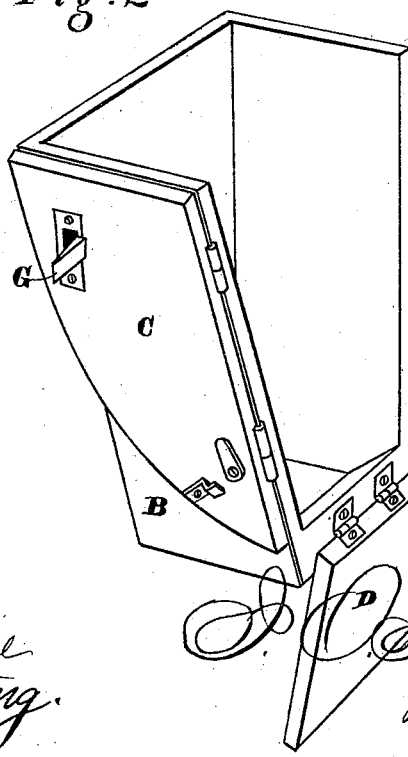

Referring to the accompanying drawings for a more complete explanation of my invention, Figures 1 and 2 are perspective views of my invention.

A is a box, which is made to be set upon one side of the manger. This box has one side, B, made flaring, or standing at an angle, and this angular side will be formed upon the left side when the box is fitted to the right end of the manger, and upon the right side when the box is fitted to the left end of the manger.

A wing-piece, C, is hinged to the edge of the inclined side B, and projects out, as shown. A low inclined front, D, is hinged so as to project outward, and a catch, E, is secured to it so as to interlock with a latch upon the wing C, the button F securing them.

The box shown in the present case is intended to be placed at the right end of manger, and the horse will be tied to the manger just outside of the feed-box.

The operation then will be as follows: The feed being pla ed in the box, the animal will step back sufficiently to allow him to come up inside the wing C, and the flare of this wing will allow sufficient room for his shoulders. It will be seen that it is impossible for the animal to throw out his feed, the box being three feet high, while the side of the stall on one hand, and the wing on the other, will prevent him from throwing it out sidewise. When he has finished eating grain, he can step back and go to the hay upon the other side. By this means animals are prevented from wasting their grain, and, when taught by the use of my box, are very little liable to waste it if fed occasionally from an ordinary box. When not in use the wing C may be turned back, and it will be held in place by a latch, G, upon the side of the box, which thus takes up very little room. Air-holes H are made in the side of the box, so that the animal can breathe easily, and will have no occasion for moving until he has finished eating. This device also prevents the annoyance by fowls when they are about the stable, as they will be unable to fly down to or get at the grain while the animal is eating.

Having thus described my invention, what I claim as new, and desire to secure by Letters Patent, is—

1. An improvement in feed-boxes, the same consisting in constructing the box A, with the side B, having its flaring wing C, and the inclined front D, substantially as and for the purpose herein described.

2. The inclined hinged wing C, and the hinged front D, with the latch E and the button F, to hold the parts when extended, or allow them to be folded up, substantially as herein described.

In witness whereof I have hereunto set my hand and seal.

JOSEPH OSCAR JOHNSON. [L. S.]

Witnesses:
C. P. NANCE,
JOHN F. HAY.